US010891606B2

(12) United States Patent
Chiarella et al.

(10) Patent No.: US 10,891,606 B2
(45) Date of Patent: Jan. 12, 2021

(54) PROCESSING AN ELECTRONIC TRANSFER BETWEEN A SENDER AND RECEIVER

(71) Applicant: INTERNATIONAL BUSINESS MACHINES CORPORATION, Armonk, NY (US)

(72) Inventors: Giacomo G. Chiarella, Eastleigh (GB); Brad Roeger, Hampshire (GB); William L. Yates, Portsmouth (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 576 days.

(21) Appl. No.: 15/430,870

(22) Filed: Feb. 13, 2017

(65) Prior Publication Data

US 2018/0232710 A1 Aug. 16, 2018

(51) Int. Cl.
*G06Q 20/32* (2012.01)
(52) U.S. Cl.
CPC ......... *G06Q 20/3224* (2013.01); *G06Q 20/32* (2013.01)
(58) Field of Classification Search
None
See application file for complete search history.

(56) References Cited

U.S. PATENT DOCUMENTS

| 7,848,765 | B2 | 12/2010 | Phillips et al. |
| 8,452,666 | B2 | 5/2013 | Patel et al. |
| 9,824,376 | B1* | 11/2017 | Amacker ............... G06Q 30/06 |
| 2013/0178233 | A1 | 7/2013 | McCoy et al. |
| 2014/0297525 | A1 | 10/2014 | Levchin et al. |
| 2015/0106229 | A1 | 4/2015 | Lyman |

FOREIGN PATENT DOCUMENTS

WO   WO 2015/020732 A1   2/2015

* cited by examiner

*Primary Examiner* — Joseph W. King
*Assistant Examiner* — Amit Patel
(74) *Attorney, Agent, or Firm* — Teddi Maranzano, Esq.; Kevin P. Radigan, Esq.; Heslin Rothenberg Farley & Mesiti P.C.

(57) ABSTRACT

Methods are disclosed for a digital escrow service for an electronic transfer, where the transfer is completed based on the geographic location of the sender or receiver. The method includes obtaining information representative of a geographic area, initiating an electronic transfer, determining whether or not at least one of the sender and the receiver is located within the geographic area and executing the electronic transfer based on whether it is determined that at least one of the sender and receiver is located within the geographic area. As an enhancement, the method may include processing a transaction between a plurality of senders and a receiver.

11 Claims, 8 Drawing Sheets

PROCESSING AN ELECTRONIC TRANSFER BETWEEN A SENDER AND RECEIVER

BACKGROUND

The present invention relates to electronic transfers, and more particularly to methods, computer program products, and systems for processing an electronic transfer between a sender and receiver.

The widespread availability of computing devices and the internet has resulted in it being common for people to undertake electronic transfers (of data or money, for example) between each other, rather than sending physical objects/items (such as books, paper or cash, for example).

Typically, such electronic transfers occur immediately. In other words, electronic transfers are typically initiated and then executed nearly instantaneously. As a result, it can be very difficult for a sender to recall a transfer after it has been initiated (or requested). Instead, if after requesting or initiating a transfer, a sender does not wish for the recipient to receive or keep the electronic transfer, the sender must arrange for the transfer to be returned (e.g. transferred back or refunded). This can be difficult and inconvenient to arrange, and may even not be guaranteed to occur. In addition, these transfers are typically limited to one sender and one receiver.

Accordingly, a need exists for systems and methods for processing an electronic transfer between a sender and receiver which enables the transfer to be recalled or prevented in situations where non-completion of the transfer is required or preferable. A need also exists for distributed systems and methods for processing an electronic transfer between multiple senders and a receiver, that enable multiple senders to participate in a single electronic transfer.

SUMMARY

Provided herein, in one or more aspects, is a computer-implemented method for processing an electronic transfer between a sender and receiver. The method includes obtaining information representative of a geographic area, and initiating an electronic transfer. Further, the method includes determining whether at least one of the sender and the receiver is located within the geographic area, and executing the electronic transfer based on whether it is determined at least one of the sender and the receiver is located within the geographic area.

Computer program products and systems relating to one or more aspects, such as those summarized above, are also described and claimed herein. Further, services relating to one or more aspects are also described and may be claimed herein.

Additional features and advantages are realized through the techniques described herein. Other embodiments and aspects are described in detail herein, and are considered a part of the claimed aspects.

BRIEF DESCRIPTION OF THE DRAWINGS

Embodiments of the present invention are described herein, by way of example only, with reference to the drawings, in which.

DETAILED DESCRIPTION

It should be understood that the figures are merely schematic and are not drawn to scale. It should also be understood that the same reference numerals are used throughout different figures designate the same or similar parts.

In the context of the present application, where embodiments of the present invention constitute a method, it should be understood that such a method may be a process for execution by a computer, i.e. is a computer-implementable method. The various steps of the method therefore reflect various parts of a computer program, e.g. various parts of one or more algorithms.

Also, in the context of the present application, a (processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The illustrative embodiments provide concepts for a computer-implemented method for processing an electronic transfer between a sender and receiver. The process may include: obtaining information representative of a geographic area, defined by a geofence; initiating an electronic transfer; determining if at least one of the sender and receiver is located within the geographic area; and executing the electronic transfer if it is determined that at least one of the sender and receiver is located within the geographic area.

By way of example, the process may include, for an escrow-like service, wherein an electronic transfer is held in a pending state (for example, by third party server) only releasing from the pending state for execution the transfer based on a user meeting a number of conditions including a location condition.

One or more embodiments discussed herein may enable a data processing system to obtain information representative of a geographic area, defined by a geofence, initiate an electronic transfer, determine whether at least one of the sender and the receiver is located within the geographic area and execute the transfer based on whether or not at least one of the sender or receiver is within the geographic area. Further, one or more other embodiments may also be adapted to obtain information relating to additional parameters defined by a user of a system in order to complete a transfer. Additional parameters may include, for instance, a time slot, a date, a merchant, a third party, a parameter of the transaction, a parameter of the user or a parameter of the user's device.

In one or more implementations, a computer-implemented method is disclosed to initiate an electronic transfer and hold the transfer in a pending state until the receiver of the transfer has met the requirements defined by the sender, at which point they may collect the transfer. This method may be carried out by a data processing system.

Modifications and additional steps to a traditional electronic transaction implementation may also be utilized, which may enhance the value and utility of the inventive aspects disclosed herein.

According to one or more further aspects of the present invention, a computer program product is provided for processing an electronic transfer between a sender and receiver, the computer program product including a computer readable storage medium having program instructions embodied therewith, the program instructions executable by a processing unit to cause the processing unit to perform a method including: obtaining information representative of a geographic area; initiating an electronic transfer; determining whether at least one of the sender and the receiver is located within the geographic area; and executing the electronic transfer based on whether it is determined at least one of the sender and receiver is located within the geographic area.

According to yet another aspect, a processing system is disclosed herein including at least one processor and computer program product according to one or more embodiments, wherein the at least one processor is adapted to execute the computer program code of the computer program product.

The processing system may be adapted to act as an electronic transfer processing component situated between a sender and a receiver. The processing system may be adapted to implement a part of an off-premise platform, such as a cloud-based system or server.

Thus, a system is disclosed herein which is adapted to analyze location data/information and determine whether or not to execute an electronic transaction based on the result of the analysis. The system may be configured and used by a sender or originator of the electronic transaction to place a geographic constraint (and potentially other constraints) on the execution/completion of the transaction.

Thus, according to one or more embodiments of the present invention, a system is provided for processing an electronic transfer between a sender and receiver, the system including: a data acquiring unit adapted to obtain information representative of a geographic area; a processing unit adapted to initiate an electronic transfer; a data analysis unit determining whether or not at least one of the sender and the receiver is located within the geographic area; and a transfer execution unit adapted to execute the electronic transfer based on whether it is determined at least one of the sender and receiver is located within the geographic area.

One or more embodiments may therefore provide a system which enables delayed and automated electronic transaction execution or denial.

In some embodiments, the system may further include a rule input interface adapted to obtaining information representative of one or more rules relating to at least one of: a time; a date; a duration; a merchant; a third party; and a parameter of a transaction, wherein the data analysis unit is adapted to determine if the one or more rules are met, and wherein the transfer execution unit is adapted to execute the electronic transfer is further based on whether it is determined the one or more rules are met.

In particular, the system may allow a user to input additional rules, in conjunction with defining the geofence that must be satisfied by another user in order for payment to be collected.

In an embodiment, the information representative of a geographic area may include information describing a geofence, the geofence defining a perimeter around a geographic area.

The system may understand a geofence as a virtual perimeter for a real-world geographic area. A geofence may define a preexisting perimeter for a geographic area such as; a zip code area, a city district, a city boundary, a province, a state, a country, an ordinance survey grid square, an area defined by a plurality of latitude and longitude measurements, an area within a radius of a latitude and longitude measurement or the like, in a virtual landscape.

A geofence may also be defined by a user input. For example, a first user may wish to authorize a transfer only if the second user is in a certain location, such as within the vicinity of a shop. In this case, the first user may enter the latitude and longitude, which are readily available online, of the shop and set a radius of fifty meters to define the geofence. By this method, the second user is only able to collect the transfer if they are within fifty meters of the shop.

In another embodiment, a user may be able to select a location, such as a shop, from a list of predetermined locations and define a radius, such as fifty meters, to act as a geofence for the transfer.

The data analysis unit may be adapted to obtain location information representative of a location of the at least one of the sender and the receiver, and to analyze the location information to determine if the at least one of the sender and the receiver is located within the geographic area, defined by a geofence.

In an embodiment, the processing unit may be adapted to: communicate a transfer request to a transaction server, the request comprising information relating to: the receiver; and a transfer parameter value. The transaction server may then be adapted to determine if the electronic transfer is authorized based on: the communicated transfer request and information relating to the sender, wherein, responsive to determining the electronic transfer is not authorized, the system may be adapted to prevent execution of the electronic transfer, and, responsive to determining the electronic transfer is authorized, the system may be adapted to permit the transfer execution unit to execute the electronic transfer based on whether it is determined at least one of the sender and receiver are located within the geographic area.

In one or more embodiments, the transfer execution unit may be adapted, in response to determining at least one of the sender and receiver is located within the geographic area, to process the electronic transfer so as to complete the transfer from the sender to the receiver.

Figure 1:
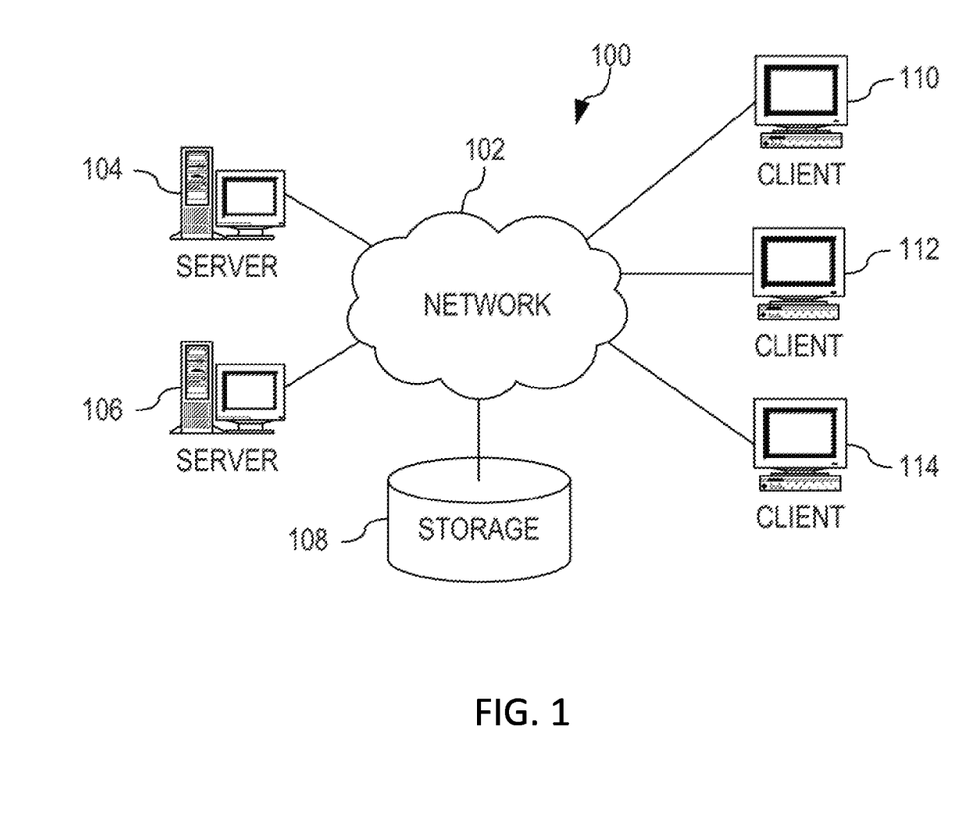
FIG. 1 one embodiment of a distributed data processing system, in which one or more aspects of the present invention may be implemented.
Figure 2:
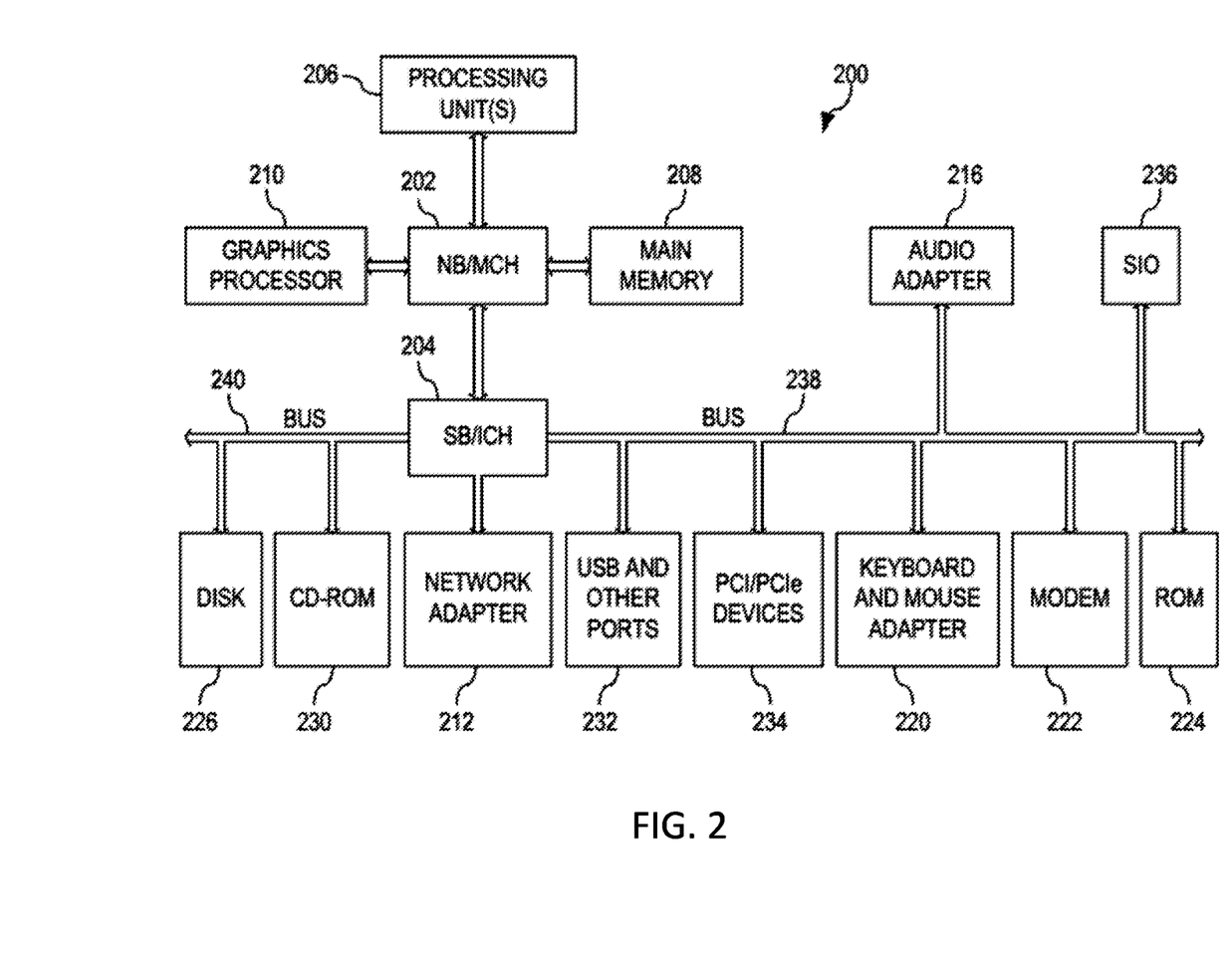
FIG. 2 is a block diagram of an example data processing system in which one or more aspects of the present invention may be implemented.

Illustrative embodiments may be utilized in many different types of data processing environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed electronic transaction processing system in which aspects of the illustrative embodiments may be implemented. Distributed data processing system 100 may include a network of computers in which aspects of the illustrative embodiments may be implemented. The distributed processing system 100 contains at least one network 102, which is the medium used to provide communication links between various devices and computers connected together within distributed data processing system 100. The network 102 may include connections, such as wire, wireless communication links, or fiber optic cables.

In the depicted example, first 104 and second 106 servers are connected to the network 102, along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed processing system 100 may be the Internet, with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 depicts a block diagram of an example data processing system 200, in which aspects of one or more illustrative embodiments may be implemented. The data processing system 200 is an example of a computer, such as client 110 in FIG. 1, in which computer usable code or instructions implementing the processes for illustrative embodiments of the present invention may be located.

In the depicted example, data processing system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on the processing unit 206. The operating system coordinates and provides control of various components within the data processing system 200 in FIG. 2. As a client, the operating system may be a commercially available operating system. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. The data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. Similarly, one or data structures according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as first bus 238 or second bus 240 as shown in FIG. 2, may include one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to multiprocessor/server systems, other than those illustrated, without departing from the scope of the proposed concepts.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, the data processing system 200 may be a portable computing device that is configured with flash memory to provide non-volatile memory for storing operating system files and/or user-generated data, for example. Thus, the data processing system 200 may essentially be any known or later-developed data processing system without architectural limitation.

In accordance with one or more aspects, a data processing system (such as that depicted in FIG. 2) may be enhanced by providing for an electronic transfer to be made dependent on a geographic constraint, such as disclosed herein.

Figure 3A:
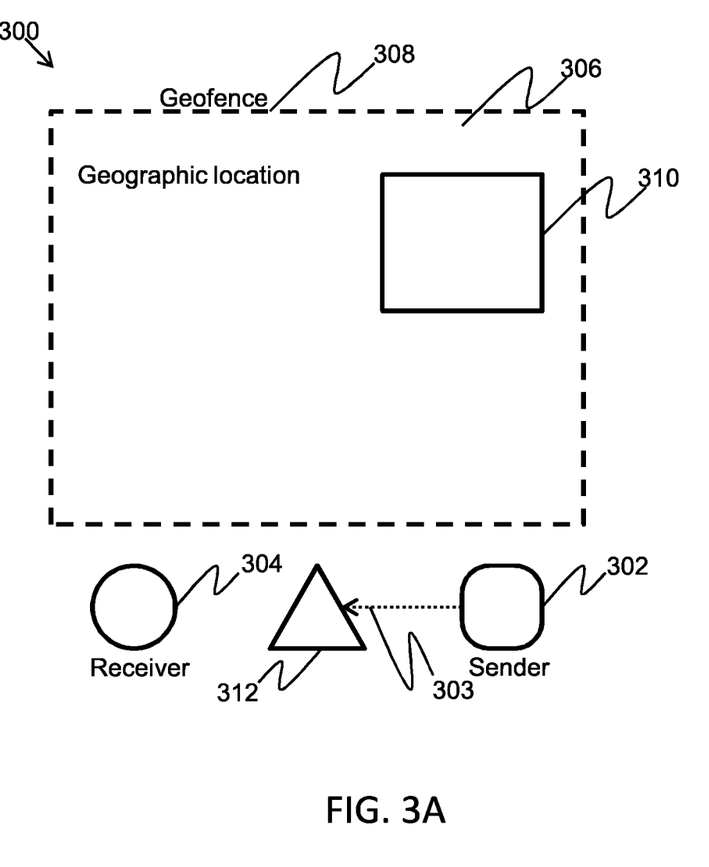
FIGS. 3A & 3B depict a method of processing an electronic transfer based on the location of the recipient of the transfer with respect to a geofence, in accordance with one or more aspects of the present invention.
Figure 3B:
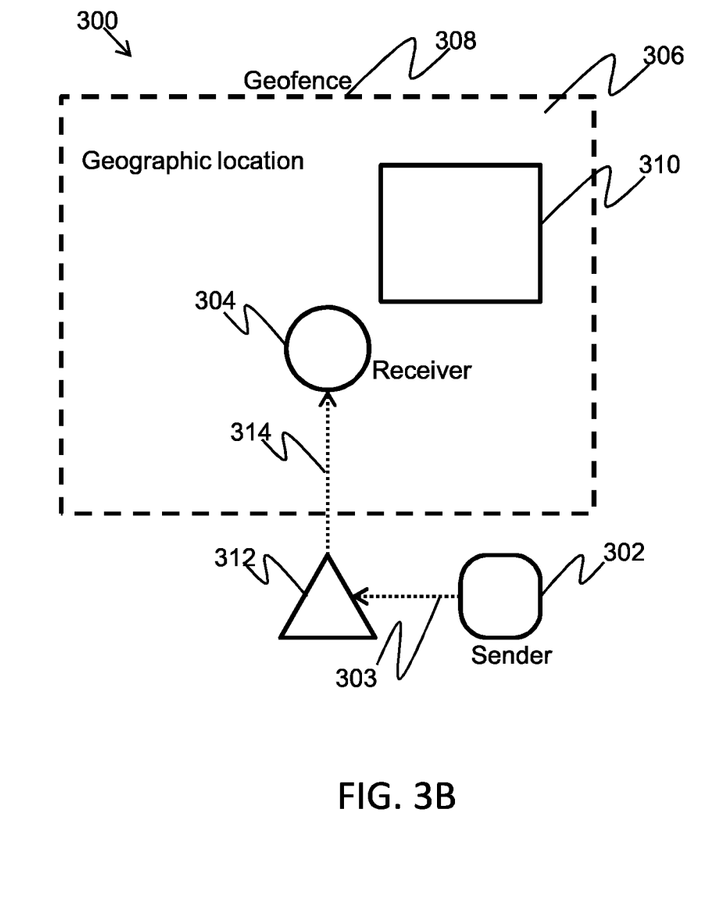

FIGS. 3A and 3B depict a simplified block diagram of one embodiment 300 of a process, in accordance with one or more aspects of the present invention. In FIG. 3A, a sender 302 may wish to make an electronic transfer 303 to a receiver 304. The sender may define a geographic location 306, the perimeter of which may be defined by a geofence 308, that the receiver must go to in order to collect the electronic transfer. For example, the geofence may outline a user defined area around a certain location, such as a shop 310. The electronic transfer may then be initialized by the sender, which may then be held in a pending state 312, until the receiver is located within the geofence.

A geofence 308 is a virtual perimeter for a real-world geographic area 306. A geofence may define a pre-existing perimeter for a geographic area such as; a zip code area, a city district, a city boundary, a province, a state, a country, an ordinance survey grid square, an area defined by a plurality of latitude and longitude measurements, an area within a radius of a latitude and longitude measurement or the like, in a virtual landscape.

A geofence 308 may also be defined by a user input. For example, the sender 302 may wish to authorize an electronic transfer 303 only if the receiver 304 is in a certain location, such as a shop 310. In this case, the sender may enter the latitude and longitude, which are readily available online, of the shop and set a radius of fifty meters to define the geofence. By this method, the receiver may only collect the transfer if they are within fifty meters of the shop.

In another embodiment, a user may be able to select a location, such as a shop 310, from a list of predetermined locations and define a radius, such as fifty meters, to act as a geofence 308 for the transfer.

In FIG. 3B, the receiver 304 has entered the geographic location 306, defined by geofence 308, as requested by the sender 302. The electronic transfer 303 held in the pending state 312 may then be completed and may be collected 314 by the receiver.

In one or more embodiments, the sender 302 may define additional parameters for the receiver 304 to meet in order to collect the electronic transfer 303. For example, the sender may define a time slot or a date that the transfer may be collected from the geographic location 306 defined by the geofence 308. In such a case, prior to or after the time slot or date, the transfer may be unavailable for collection by the receiver even if the receiver is located within the geofence. This may help to prevent the receiver from being able to collect the payment from the geographic location at an undesired time. For example, if the sender and receiver are planning to attend an event at a certain time on a given date, the sender may wish to establish a financial transfer for collection at the event, so that the receiver may purchase the tickets for both of them if they arrive first. The sender may define rules for the payment to be available for collection only on the day of the event, at the expected time of arrival of the receiver. This may decrease the likelihood of the receiver being able to collect the ticket payment without attending the event.

As a further example, the sender may define a merchant or third party, such as a shop 310, that the receiver must perform an authentication process with, such as completing a transaction, before the transfer becomes available for collection. In this case, the receiver may attend the correct geographic location but may be prevented from collecting the transfer unless they receive authentication from the desired merchant or third party. Returning to the example of the event, the receiver may be unable, in this case, to collect the payment from the sender unless they have completed a ticket purchase with the events company. This may further ensure that the receiver may only collect payment for the purpose intended by the sender.

In yet another example, the sender may define a parameter of the transaction, such as a total cost for a financial transfer, a parameter of the receiver, such as biometric identification, and/or a parameter of the receiver's device, such as trusted device authentication. This may add a further level of reassurance to the sender, that the transfer is being utilized in the desired manner. In other words, the sender may be assured that the receiver is not spending less than the agreed amount of money and collecting extra from the sender. By requiring a parameter of the receiver or receiver's device, the transfer may be more secure as only the desired recipient may collect the transfer.

Advantageously, by introducing additional requirements for the receiver to collect the transfer from the sender, confidence in the electronic transfer system may be increased.

Figure 4A:
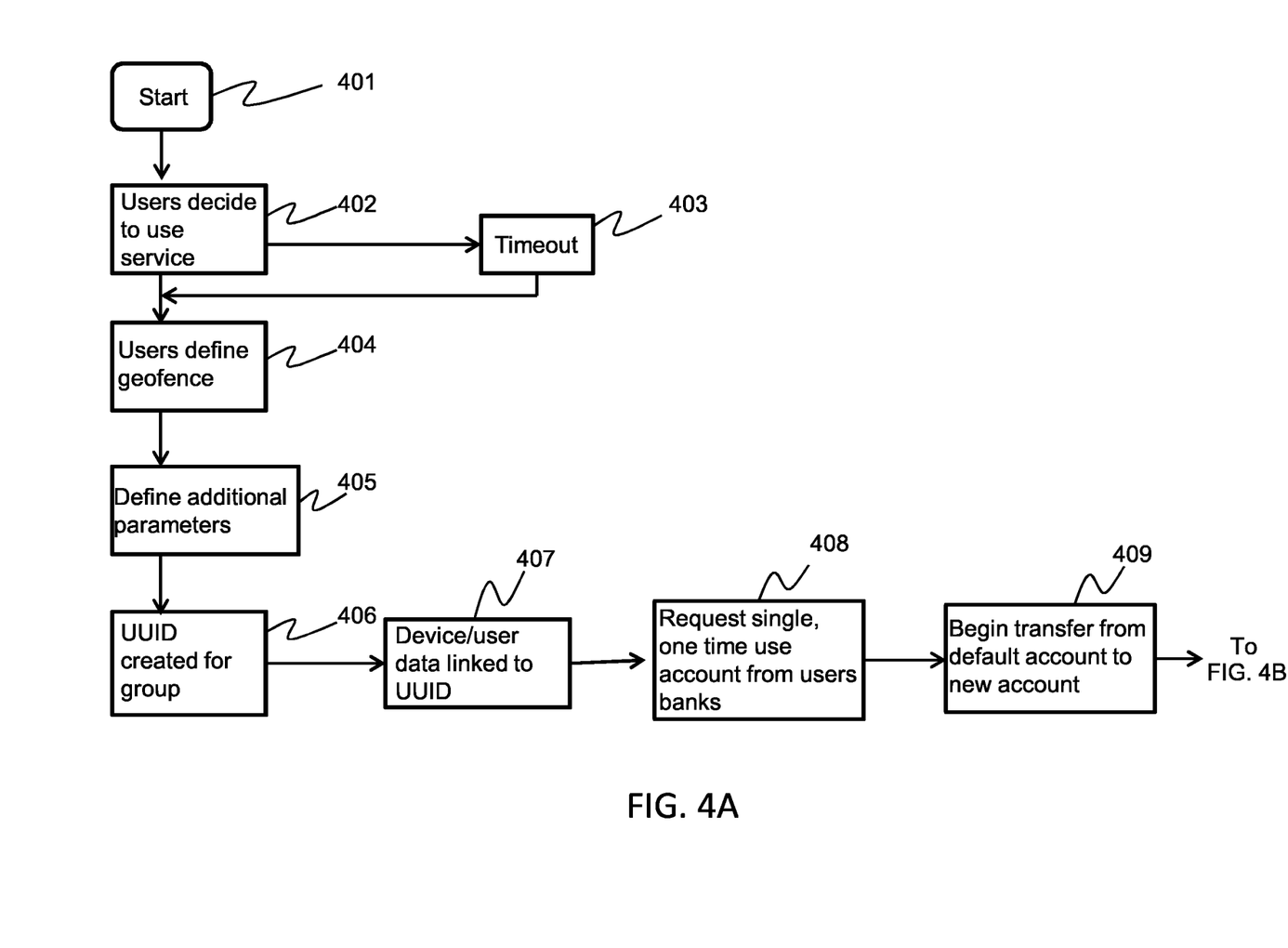
FIGS. 4A-4C depict one embodiment of a process, in accordance with one or more aspects of the present invention.
Figure 4B:
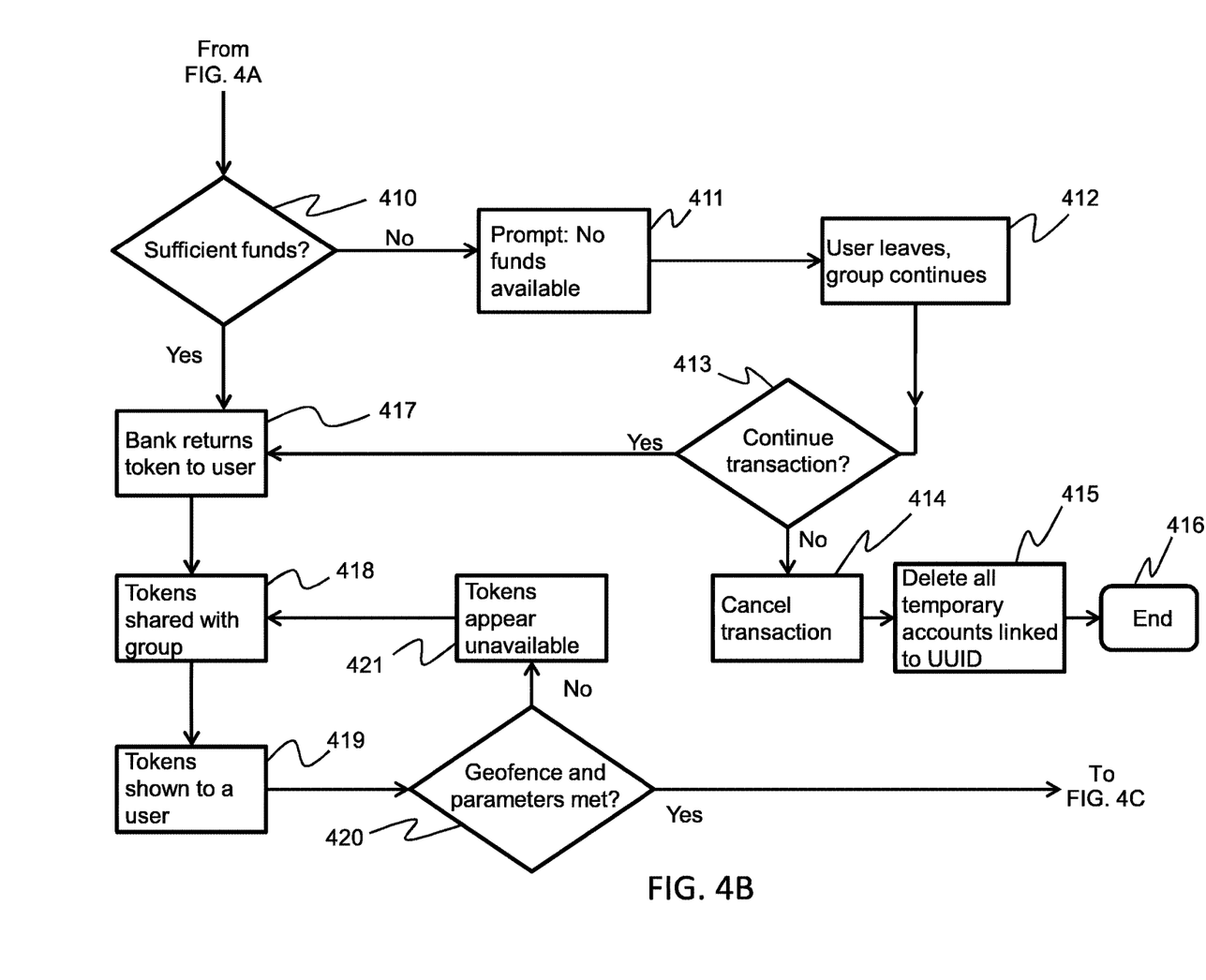
Figure 4C:
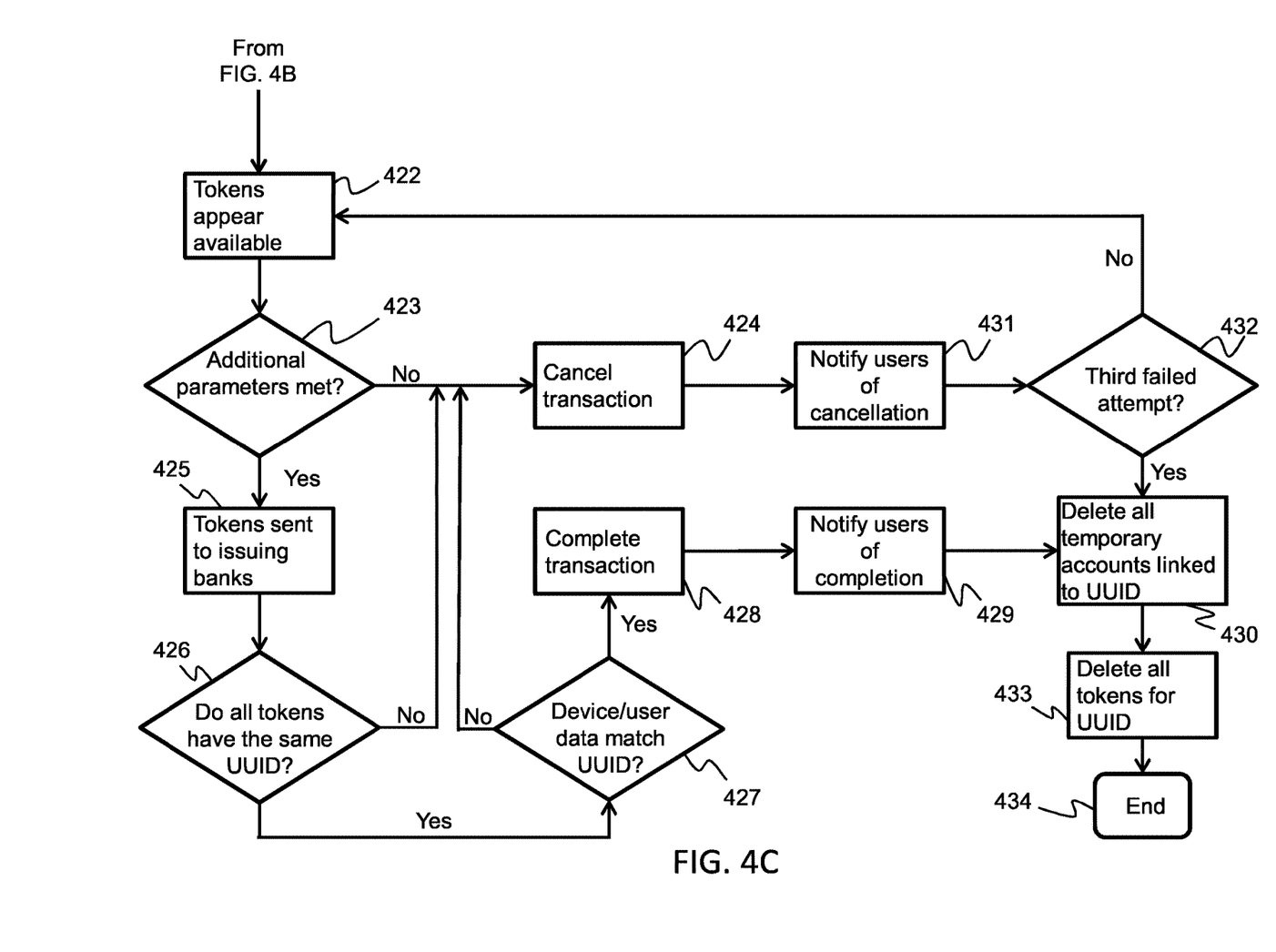

FIGS. 4A to 4C depict one embodiment of a process, in accordance with one or more aspects of the present invention. FIG. 4A shows the initial stages of a method. The process may begin at step 401 and a group of users may decide that they want to utilize the digital escrow service presented here in step 402.

For the purpose of this example, a group of users may, for instance, wish to attend a movie at the cinema and they may want the first person that arrives at the cinema to purchase tickets for the group. However, the users may be unsure of who will arrive first and so decide to use the electronic transfer service presented here so that any group member may collect the money from the other users when they have purchased the tickets.

In step 403 of the method, each user's device may check for any previous transactions that have expired, and any that are found may be deleted from the device. This process may be repeated regularly, for example every minute, so as to ensure that the user's device does not hold unnecessary information on expired transactions.

In step 404, the users may define a geofence surrounding the desired geographic location for the transfer to take place. In this case, the users may define an area around the cinema as the geofence, such as a fifty-meter radius. In this way, a member of the group may only collect the payment from the other group members if they are within fifty meters of the cinema. Additional parameters may be defined in step 405, such as a time slot, a merchant and a parameter of the transaction. For the present case, the additional parameters are 7 PM to 8 PM, the intended cinema and a cost of $10 per person, respectively. Such parameters may ensure that a group member must be at the correct cinema, at the correct time and spend the intended amount of money in order to be able to collect the payment from the other users.

In step 406, a unique user identification (UUID) may be created for the group. This may be unique to this group for this transaction and ensures no one outside of the intended group of users may access and collect the electronic transfer. In order to increase the security of the system, information relating to the users and their associated devices may be linked to the UUID for authentication purposes in step 407. For example, a member of the group may only be able to collect the payment using a trusted device, such as the device used to initialize the payment, and may be required to provide biometric identification, such as a fingerprint scan.

In step 408, the escrow service may request a single, one time use account for each user from their banks to be used in the proposed group transaction. Following this, in step 409, the payment amount may be transferred from each user's default banking accounts to their new one-time-use account.

FIG. 4B shows example intermediate stages of the method. The banks may then test to see if each user has sufficient funds to complete the transaction in step 410. If a user does not have sufficient funds, the method may progress to step 411 where the user may receive a prompt, informing them that they have insufficient funds for the transaction. In step 412, the user may be removed from the group and the transaction may continue with the remaining group members, if any. Following this in step 413, the remaining group members, may be informed that a member is unable to complete the transaction and may be given the option to either continue with the transaction or cancel it. If the remaining group members decide not to continue with the transaction, the method may progress to step 414 and the transaction may be cancelled. In step 415, the temporary accounts linked to the UUID may be deleted and the process may then end in step 416. If the group decides to continue with the transaction, or if the user had sufficient funds in step 410, the banks may issue a payment token to each remaining user, linked to the new one time use account in step 417. Payment tokens such as this are well known in the art.

This process of pre-approving a user to make a payment, based on their available funds, may eliminate the risk of another user not being able to collect payment from the group members once they have fulfilled the required parameters.

In step 418, the payment tokens may then be shared among the users linked to the UUID. Each user may possess a copy of their token as well as copies of the tokens of every other group member. In step 419 of the method, the payment tokens may be displayed to a user on their device, such as a smartphone. The payment tokens may appear visually as a group of debit cards within their digital wallet.

The method may then progress to step 420 and may check whether the user is within the geofence defined in step 404. It may also be possible at this stage to check additional parameters of the transaction, such as is the user within the geofence between the times of 7 PM and 8 PM.

If it is determined that the user does not satisfy these conditions, then the payment tokens may appear as unavailable in step 421. This may be visually represented, for example by outlining the debit cards or greying out the images. The method may then return to step 418 and may continue to check each user's location with respect to the geofence at the correct time.

As illustrated, if it is determined that the user does satisfy the requirements in step 420, then the method may progress to step 422 of FIG. 4C.

In step 423 it is possible to check whether additional parameters are met by the user, such as purchasing the cinema tickets at the correct price and at the correct cinema. If these additional conditions are not met when a user attempts to claim payment from the group, then the method may progress to step 424, and the transaction may be cancelled.

However, if the additional requirements are satisfied by the user, then the payments tokens may be sent to the banks that issued them for verification in step 425. The tokens may be checked in step 426 to ensure that the tokens are all linked to the same UUID that may have been issued in step 406. If they are not, the method may progress to step 424 and the transaction may be cancelled.

If all of the tokens are determined to be linked to the same UUID in step 426, then the method may progress to step 427 and the parameters of the user and the user's device may be compared to those linked to the UUID in step 407. If these parameters do not match, then the method may move to step 424 and the transaction may be cancelled.

If the parameters of the user and the user's device are found to match in step 427 then the method may progress to step 428 and the transfer may be completed. In this case, a member of the group may now collect the payment from the other group members.

In step 429, all of the users may be notified that the transfer has been completed and then, in step 430, all of the temporary accounts linked to the UUID may be deleted. In this way multiple users may be prevented from attempting to collect the transfer.

Returning now to step 424, where the transaction has been cancelled due to a variety of possible reasons, the method may then progress to step 431 where all of the users may be notified that the transaction has been cancelled. This notification may be accompanied with a reason for cancellation, for example one of the users attempted to collect payment at the incorrect merchant.

From here, the method may check how many times this transfer has been attempted and failed in step 432. For instance, if the transfer has failed less than three times, then the method may return to step 422 and may resume its normal course. However, if the transfer has failed three times, the method may progress to step 430 and all of the temporary accounts linked to the UUID may be deleted without completing the transfer.

In step 433, all of the payment tokens may be deleted for the UUID and the method may end at step 434.

In one or more other embodiments, the method may also include a process for handling leftover money when dealing with a financial transaction. If the total cost of the final transaction is less than the total amount provided by the users, then the transaction may continue rather than being cancelled. The remainder of the money may then be distributed back to the users. This aspect of the method may be used at times where the exact cost of the proposed transaction is not known by the users.

Returning to the example of the group of users attending a movie at the cinema, the members of the group may not know the exact cost of the tickets. In this case, the group may define a payment of up to $20 each as an acceptable limit. The user that arrives at the cinema first pays for the tickets at a price of $10 each and collects $10 from each user. The remaining money is then redistributed to each user and the transaction is complete. This process may also work where each user defines a different upper limit to the transaction cost. In this case, each user would receive the remainder of their individual contribution, rather than the remaining money being distributed evenly among all users.

Embodiments may therefore be thought of as initiating electronic transfers between multiple users, testing to see if predetermined parameters are met and then completing the transfer if the parameters are met.

Those skilled in the art will note from the above discussion that provided herein, in one or more aspects, is a method for processing an electronic transfer that may enable a user to prevent the transfer from being executed or completed unless particular conditions are met. Such conditions may be based on whether the intended recipient of the transfer visits a predetermined location. One or more embodiments may thus provide improved security or trust in making electronic transfers and/or enable greater control over implementing electronic transfers.

Further, disclosed herein is a method for processing an electronic transfer that may enable multiple users to participate in the sending of an electronic transfer to a receiver.

In addition, disclosed herein is a computer program product including computer program code for implementing the proposed analysis concepts when executed on a processor.

Still further, disclosed herein is a system (such as a processing device and/or network component) adapted to execute this computer program code.

According to one or more embodiments of the present invention, a computer-implemented method is provided for processing an electronic transfer between a sender and receiver, the method comprising: obtaining information representative of a geographic area; initiating an electronic transfer; determining whether at least one of the sender and the receiver is located within the geographic area; and executing the electronic transfer based on whether it is determined at least one of the sender and receiver is located within the geographic area.

Disclosed herein is a method of making the execution or completion of an electronic transfer dependent on a user visiting a specific location or geographic area. In this way, an electronic financial transaction (e.g. transferring funds electronically from a banking account of a sender to a bank account of a receiver) may require the recipient to go to a predetermined location (such as the location of a merchant or vendor for example) before the transaction is executed and/or completed. This may, for example, prevent a person from receiving funds for an activity that they have not completed.

In one or more implementations, an escrow-like service is provided herein, wherein an electronic transfer is held in a pending state and only released from the pending state for execution/completion based on a user's location.

One or more embodiments disclosed may be thought as being similar to a 'dead drop' where an item for transfer would be hidden in a location only known by the two participants (i.e. the sender and recipient) of the transaction. This enforces the requirement that the recipient has to visit a particular location to complete the transaction. Disclosed embodiments may thus employ a technique that is thought of as a digital dead drop which is based upon geographical location. Also, completion of the transaction may be made further dependent on additional constraints, such as date, time and/or duration at the location for example, thereby making the transaction dependent on whether or not certain conditions have been met.

Such processes to make execution of a transfer or transaction dependent on a geographic area/location may be facilitated by the abilities of portable computing devices (such smartphone, tablet PCs, laptop computers, smartwatches, etc.) to accurately determine and/or monitor a user's location, movement, activity, etc.

In one or more embodiments, the method may further include: obtaining information representative of one or more rules relating to at least one of: a time; a date; a duration; a merchant; a third party; a parameter of a transaction; a parameter of a user; and a parameter of a user's device; and determining if the one or more rules are met. The step of executing the electronic transfer may then be further based on whether it is determined the one or more rules are met.

In other words, disclosed (in one or more aspects) is a process of making the execution or completion of an electronic transfer dependent on a user fulfilling a plurality of criterion that includes at least visiting a specific location or geographic area.

Such embodiments may, for example, require that the user visit a specific location or geographic area at specific time or on a certain date. Further, in one or more embodiments, the process may require the user to visit a specific merchant or third party within the specific geographic area. In yet further or other embodiments, various parameters of the transaction, such as total cost, parameters of the user, such as biometric identification, or parameters of the user's device, such as trusted device recognition, may need to be met in order for the transfer to be executed.

In one or more embodiments, additional levels of authentication may be required in order for a transaction to be executed. This would prevent a user from inappropriately collecting a payment for an unintended purpose by simply visiting the specific geographic location. Rather, the user may have to visit the specific location and, for example, complete the intended transaction with a specific merchant before they may collect payment from another user.

One or more implementations, a user may define additional rules to be met before the transfer is executed. For example, a user may define a time frame or date at which the transfer may be available for collection. In another example, a user may define a requirement for authentication from a specific merchant or trusted third party. For instance, a user may require another user to perform an authentication process with a merchant, such as a shop, in order to execute the transfer. In a further example, a user may define a parameter of a transaction, such as total cost, to be fulfilled in order to execute the transfer. In yet another example, a user may define a parameter of another user, such as biometric identification, or another user's device, such as trusted device authentication, to be met in order to execute a transfer. By using one or more of these authentication requirements, within the defined geofence, the transfer becomes more secure and less likely to be misused, building user confidence in the system.

The information representative of a geographic area may include information describing a geofence, the geofence defining a perimeter around the geographic area.

By way of explanation, a geofence is a virtual perimeter for a real-world geographic area. A geofence may define a pre-existing perimeter for a geographic area such as; a zip code area, a city district, a city boundary, a province, a state, a country, an ordinance survey grid square, an area defined by a plurality of latitude and longitude measurements, an area within a radius of a latitude and longitude measurement or the like, in a virtual landscape.

A geofence may also be defined by a user input. For example, a first user may wish to authorize a transfer only if the second user is in a certain location, such as within the vicinity of a shop. In this case, the first user may enter the latitude and longitude, which are readily available online, of the shop and set a radius of fifty meters to define the geofence. By this method, the second user is only able to collect the transfer if they are within fifty meters of the shop.

A geofence may therefore be thought of as defining a virtual perimeter or boundary line for a real-world geographic area. A geographic area may include, for example, an indoor shopping mall, an outdoor shopping mall, a shopping district, an airport, or any other suitable geographic area. A geographic area may thus include an event venue such as a stadium, arena, hall, theater, convention center, hotel, or other suitable venue.

Also, a geofence may be assigned a unique geofence identifier (or "geofence ID"). In certain embodiments, only geofence identifiers may be stored (e.g., cached) on a user device, such that additional data associated with a geofence is not stored on the user device, thus minimizing memory usage of the stored or cached geofences.

In another embodiment, a user may be able to select a location, such as a shop, from a list of predetermined locations and define a radius, such as fifty meters, to act as a geofence for the transfer.

In one or more embodiments, a user device (such as a mobile phone, portable computing device, or smartwatch) may store local geofence information and detect when the mobile user device enters a geofenced area. For example, a mobile user device may obtain location data via communication with a satellite-based positioning system (e.g., GPS) or other suitable locating techniques, such as Wi-Fi based locating, IP address geolocation, or other techniques.

In one or more embodiments, determining whether or not at least one of the sender and the receiver are located within the geographic area may include: obtaining location information representative of a location of the at least one of the sender and the receiver; and analyzing the location information to determine if the at least one of the sender and the receiver is located within the geographic area. By obtaining location information for the receiver, it may be possible to monitor their location with respect to the geographic area defined by the sender. In this way, it may be known at what time the receiver entered the geographic area and for how long they remained there. This may allow for a more accurate way of determining if the receiver may collect the transfer, for example if they are required to be within the geographic area for a certain length of time.

The geographic area may be described by a geofence, the geofence defining a perimeter around a geographic location. If the location information representative of a location of the receiver indicates that the receiver is within the perimeter defined by the geofence, the transfer may be executed. The geofence may describe a real-world geographic area, such as a zip code, or may be defined by a user, such as a radius around a specific address. In some embodiments, the receiver may be required to be within the geofence during a time slot defined by the sender. The sender may also define additional rules to be met in order to execute the transfer, as discussed above.

In an embodiment, initiating an electronic transfer may include: communicating a transfer request to a transaction server, the request comprising information relating to: the receiver; and a transfer parameter value; determining, at the transaction server, if the electronic transfer is authorized based on: the communicated transfer request and information relating to the sender; and based on determining that the electronic transfer is not authorized, preventing execution of the electronic transfer; and based on determining that the electronic transfer is authorized, permitting executing the electronic transfer based on whether it is determined at least one of the sender and receiver are located within the geographic area.

Disclosed herein, in one or more embodiments, is a process which may include initiating an electronic transfer by communicating a transfer request to a transaction server. This request contains information relating to the intended recipient of the transfer and to the contents and nature of the transfer itself, for example an amount of money for a financial transaction. The transaction server then determines whether the transfer may be authorized based on information relating to the sender. For example, in the case of a financial transfer, the transaction may only be authorized at this stage if the sender has sufficient funds in their banking account. If the information relating to the sender does not allow for the transfer to be authorized, such as insufficient funds in their banking account, the execution of the electronic transfer is prevented. If the information relating to the sender does allow for the transfer to be authorized, for example sufficient funds in their banking account, then the execution of the electronic transfer is permitted. The electronic transfer may be collected if at least one of the sender and receiver are within the geographic area defined by the geofence.

Executing the electronic transfer may include: based on determining that at least one of the sender and receiver is located within the geographic area, processing the electronic transfer so as to complete the transfer from the sender to the receiver. In the case of a financial transfer, the preapproved payment may be collected by the receiver when they are within the desired geofence. This may allow for a quick and convenient way of providing and collecting payment for a task that requires the receiver to attend a specific geographic area.

The sender may define additional rules to be met by the receiver, such as being located within the geographic area defined by the geofence during a certain time slot on a specific date. Further parameters may also be defined by the sender, as discussed above, to be met by the receiver in order to allow them to collect the transfer. In this way, the sender may be reassured that the receiver is only able to collect and use the transfer for the purpose agreed between the sender and the receiver.

In some embodiments, the electronic transfer may include a financial transaction between the sender and the receiver. This may be advantageous in the case where a user wishes to send money to another user for the completion of a task in a specific area, for example a homeowner may wish to pay a cleaner to clean their house. The homeowner may be assured that the cleaner was in the correct area to complete the task by defining a geofence within which the second user may collect payment, such as the house. The homeowner may establish additional parameters, such as time and date, to further ensure that the desired task has been completed by the cleaner. This may help to prevent an automatic payment being paid to the cleaner if they were unable to attend the house and complete the desired task.

In one or more embodiments, the electronic transfer may include a transfer of data from the sender to the receiver. For example, a user may wish to send an electronic transfer, such as a confidential, work related document, to another user. In order to ensure that the confidential document may only be viewed by the user in a secure location, the first user may define a geofence, for example a radius around the second user's place of work, within which the second user may collect the document. In this way, the confidential document may only be accessed from the secure location, reducing the risk of the content being revealed in a public area.

Figure 5:
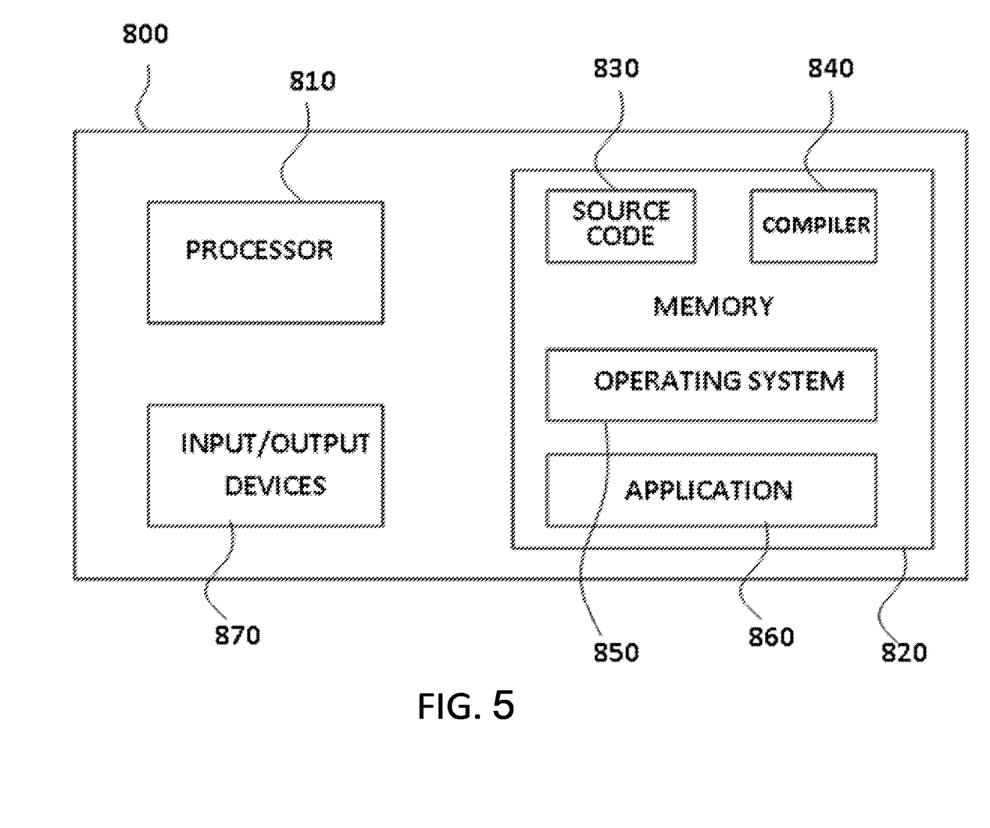
FIG. 5 illustrates one embodiment of a computer which may implement one or more aspects of the present invention.

FIG. 5 illustrates an example of a computer 800 within which one or more parts of an embodiment may be employed. Various operations discussed above may utilize the capabilities of the computer 800. For example, one or more parts of a system for analyzing location information may be incorporated in any element, module, application, and/or component discussed herein.

The computer 800 includes, but is not limited to, PCs, workstations, laptops, PDAs, palm devices, servers, storages, and the like. Generally, in terms of hardware architecture, the computer 800 may include one or more processors 810, memory 820, and one or more I/O devices 870 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 810 is a hardware device for executing software that can be stored in the memory 820. The processor 810 can be virtually any custom made or commercially available processor, a central processing unit (CPU), a digital signal processor (DSP), or an auxiliary processor among several processors associated with the computer 800, and the processor 810 may be a semiconductor based microprocessor (in the form of a microchip) or a microprocessor.

The memory 820 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 820 may incorporate electronic, magnetic, optical, and/or other types of storage media. Note that the memory 820 can have a distributed architecture, where various components are situated remote from one another, but can be accessed by the processor 810.

The software in the memory 820 may include one or more separate programs, each of which comprises an ordered listing of executable instructions for implementing logical functions. The software in the memory 820 includes a suitable operating system (O/S) 850, compiler 840, source code 830, and one or more applications 860 in accordance with exemplary embodiments. As illustrated, the application 860 comprises numerous functional components for implementing the features and operations of the exemplary embodiments. The application 860 of the computer 800 may represent various applications, computational units, logic, functional units, processes, operations, virtual entities, and/or modules in accordance with exemplary embodiments, but the application 860 is not meant to be a limitation.

The operating system 850 controls the execution of other computer programs, and provides scheduling, input-output control, file and data management, memory management, and communication control and related services. It is contemplated by the inventors that the application 860 for implementing exemplary embodiments may be applicable on all commercially available operating systems.

Application 860 may be a source program, executable program (object code), script, or any other entity comprising a set of instructions to be performed. When a source program, then the program is usually translated via a compiler (such as the compiler 840), assembler, interpreter, or the like, which may or may not be included within the memory 820, so as to operate properly in connection with the O/S 850. The I/O devices 870 may include input devices such as, for example but not limited to, a mouse, keyboard, scanner, microphone, camera, etc. Furthermore, the I/O devices 870 may also include output devices, for example but not limited to a printer, display, etc. Finally, the I/O devices 870 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 870 also include components for communicating over various networks, such as the Internet or intranet.

If the computer 800 is a PC, workstation, intelligent device or the like, the software in the memory 820 may further include a basic input output system (BIOS) (omitted for simplicity). The BIOS is a set of essential software routines that initialize and test hardware at startup, start the O/S 850, and support the transfer of data among the hardware devices. The BIOS is stored in some type of read-only-memory, such as ROM, PROM, EPROM, EEPROM or the like, so that the BIOS can be executed when the computer 800 is activated.

When the computer 800 is in operation, the processor 810 is configured to execute software stored within the memory 820, to communicate data to and from the memory 820, and to generally control operations of the computer 800 pursuant to the software. The application 860 and the O/S 850 are read, in whole or in part, by the processor 810, perhaps buffered within the processor 810, and then executed.

When the application 860 is implemented in software it should be noted that the application 860 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 860 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented, the method comprising:
   receiving, by one or more processors, rule data indicative of one or more rules to be satisfied in order for execution of an electronic transfer to a receiving device to proceed, the rule data being received from a sending device and having been input by a sender via a rule input interface of the sending device, the rule data including geographic data indicative of a geographic area for which the electronic transfer can be authorized, and time interval data specifying a time interval during which the electronic transfer can be authorized, where the rule data specifies that transfer authorization can only be provided where at least one device of the sending device and the receiving device is located within the geographic area during the set time interval;

based on receiving the rule data, establishing, by the one or more processors, a geofence, the establishing including using the geographic data included in the one or more rules to define a virtual perimeter about the geographic area;

receiving, by the one or more processors, location data indicative of a location of the at least one device of the sending device and the receiving device;

based on receiving the location data, analyzing, by the one or more processors, the location data to determine whether the at least one device is located during the set time interval within the geographic area represented by the virtual perimeter;

based on determining that the at least one device is located within the geographic area during the set time interval, determining, by the one or more processors, that the one or more rules for the electronic transfer have been met;

based on the one or more rules having been met, executing, by the one or more processors, the electronic transfer; and based on executing the electronic transfer, providing, by the one or more processors, an electronic message to at least one of the sending device and the receiving device that the electronic transfer has been completed.

2. The computer-implemented method of claim 1, wherein the one or more rules to be satisfied in order for execution of the electronic transfer to proceed relate to one or more parameters selected from the group consisting of a starting time for the set time interval, a date, a duration of the set time interval, a merchant, a third party, a parameter of a transaction, and a parameter of a user's device.

3. The computer-implemented method of claim 1, wherein the electronic transfer comprises a financial transaction between the sending device and the receiving device.

4. The computer-implemented method of claim 1, wherein the electronic transfer comprises a transfer of data from the sending device and the receiving device.

5. A computer program product, the computer program product comprising:

a computer readable storage medium having program instructions embodied therewith, the program instructions being executable by a processing unit to cause the processing unit to perform a method comprising:

receiving, by one or more processors, rule data indicative of one or more rules to be satisfied in order for execution of an electronic transfer to a receiving device to proceed, the rule data being received from a sending device and having been input by a sender via a rule input interface of the sending device, the rule data including geographic data indicative of a geographic area for which the electronic transfer can be authorized, and time interval data specifying a time interval during which the electronic transfer can be authorized, where the rule data specifies that transfer authorization can only be provided where at least one device of the sending device and the receiving device is located within the geographic area during the set time interval;

based on receiving the rule data, establishing, by the one or more processors, a geofence, the establishing including using the geographic data included in the one or more rules to define a virtual perimeter about the geographic area;

receiving, by the one or more processors, location data indicative of a location of the at least one device of the sending device and the receiving device;

based on receiving the location data, analyzing, by the one or more processors, the location data to determine whether the at least one device is located during the set time interval within the geographic area represented by the virtual perimeter;

based on determining that the at least one device is located within the geographic area during the set time interval, determining, by the one or more processors, that the one or more rules for the electronic transfer have been met;

based on the one or more rules having been met, executing, by the one or more processors, the electronic transfer; and based on executing the electronic transfer, providing, by the one or more processors, an electronic message to at least one of the sending device and the receiving device that the electronic transfer has been completed.

6. A system, the system comprising:

a memory; and a processor communicatively coupled to the memory, wherein the system performs a method comprising:

receiving, by one or more processors, rule data indicative of one or more rules to be satisfied in order for execution of an electronic transfer to a receiving device to proceed, the rule data being received from a sending device and having been input by a sender via a rule input interface of the sending device, the rule data including geographic data indicative of a geographic area for which the electronic transfer can be authorized, and time interval data specifying a time interval during which the electronic transfer can be authorized, where the rule data specifies that transfer authorization can only be provided where at least one device of the sending device and the receiving device is located within the geographic area during the set time interval;

based on receiving the rule data, establishing, by the one or more processors, a geofence, the establishing including using the geographic data included in the one or more rules to define a virtual perimeter about the geographic area;

receiving, by the one or more processors, location data indicative of a location of the at least one device of the sending device and the receiving device;

based on receiving the location data, analyzing, by the one or more processors, the location data to determine whether the at least one device is located during the set time interval within the geographic area represented by the virtual perimeter;

based on determining that the at least one device is located within the geographic area during the set time interval, determining, by the one or more processors, that the one or more rules for the electronic transfer have been met;

based on the one or more rules having been met, executing, by the one or more processors, the electronic transfer; and based on executing the electronic transfer, providing, by the one or more processors, an electronic message to at least one of the sending device and the receiving device that the electronic transfer has been completed.

7. The system of claim 6, wherein the one or more rules to be satisfied in order for execution of the electronic transfer to proceed relate to one or more parameters selected from the group consisting of a starting time for the set time interval, a date, a duration of the set time interval, a merchant, a third party, a parameter of a transaction, and a parameter of a user's device.

8. The system of claim 6, wherein the electronic transfer comprises a financial transaction between the sending device and the receiving device.

9. The system of claim 6, wherein the electronic transfer comprises a transfer of data from the sending device and the receiving device.

10. The computer-implemented method of claim 1, wherein the rule data is obtained via a data acquiring unit of the one or more processors of a data processing system, the location data is analyzed by a data analysis unit of the one or more processors of the data processing system, and the electronic transfer is executed via a transfer execution unit of the one or more processors of the data processing system.

11. The computer-implemented method of claim 1, further comprising indicating, via at least one of the sending device and the receiving device, whether the one or more rules for the electronic transfer have been met.

\* \* \* \* \*